United States Patent [19]

Briant et al.

[11] Patent Number: 5,019,237

[45] Date of Patent: May 28, 1991

[54] METAL-ION VAPOR ACCELERATOR CELL

[76] Inventors: Paul Briant and Norma Frederick, both of P.O. Box 10794, Beverly Hills, Calif. 90213

[21] Appl. No.: 409,146

[22] Filed: Sep. 19, 1989

[51] Int. Cl.[5] .............................................. B01D 17/06
[52] U.S. Cl. .................................. 204/302; 204/164; 204/186; 422/186.04; 422/186.21
[58] Field of Search ...................... 422/186.04, 186.21; 204/164, 186, 302

[56] References Cited

U.S. PATENT DOCUMENTS

| | | | |
|---|---|---|---|
| 3,496,701 | 2/1970 | Owe Berg | 204/186 |
| 3,942,975 | 3/1976 | Drummond et al. | 204/164 |
| 4,755,671 | 7/1988 | Friedland et al. | 250/298 |

FOREIGN PATENT DOCUMENTS

84/02803  7/1984  PCT Int'l Appl. .

OTHER PUBLICATIONS

Scientific American Mag. *Corona Chemistry*, pp. 90–98, Jun. 1965, by John A. Coffman and William R. Browne.

*Primary Examiner*—John F. Niebling
*Assistant Examiner*—Steven P. Marquis

[57] ABSTRACT

Both a method and apparatus to recover metal in a solid amalgamated form from waste heavy metal electrolye and to reduce the remaining substance to an inert material and distilled water. The hot electrolyte is sprayed through a direct current sparking corona discharge freeing positive and negative ions. Before they reunite they are blown with air and accelerated with polarized force fields at a non-conductive dividing hemisphere with polarity collecting plates on its sides that ions of the correct polarity take to hold to make up molecules. The blown hot ozone vapor laden air is channeled onto a condensing flue, where clean water is removed, and goes on into the next identical cell to repeat this process twice more ending with a scrubber. The electrolyte is cycled through the cells until depleted, when clean water is introduced and filtered. The substance filtered out is inert.

3 Claims, 1 Drawing Sheet

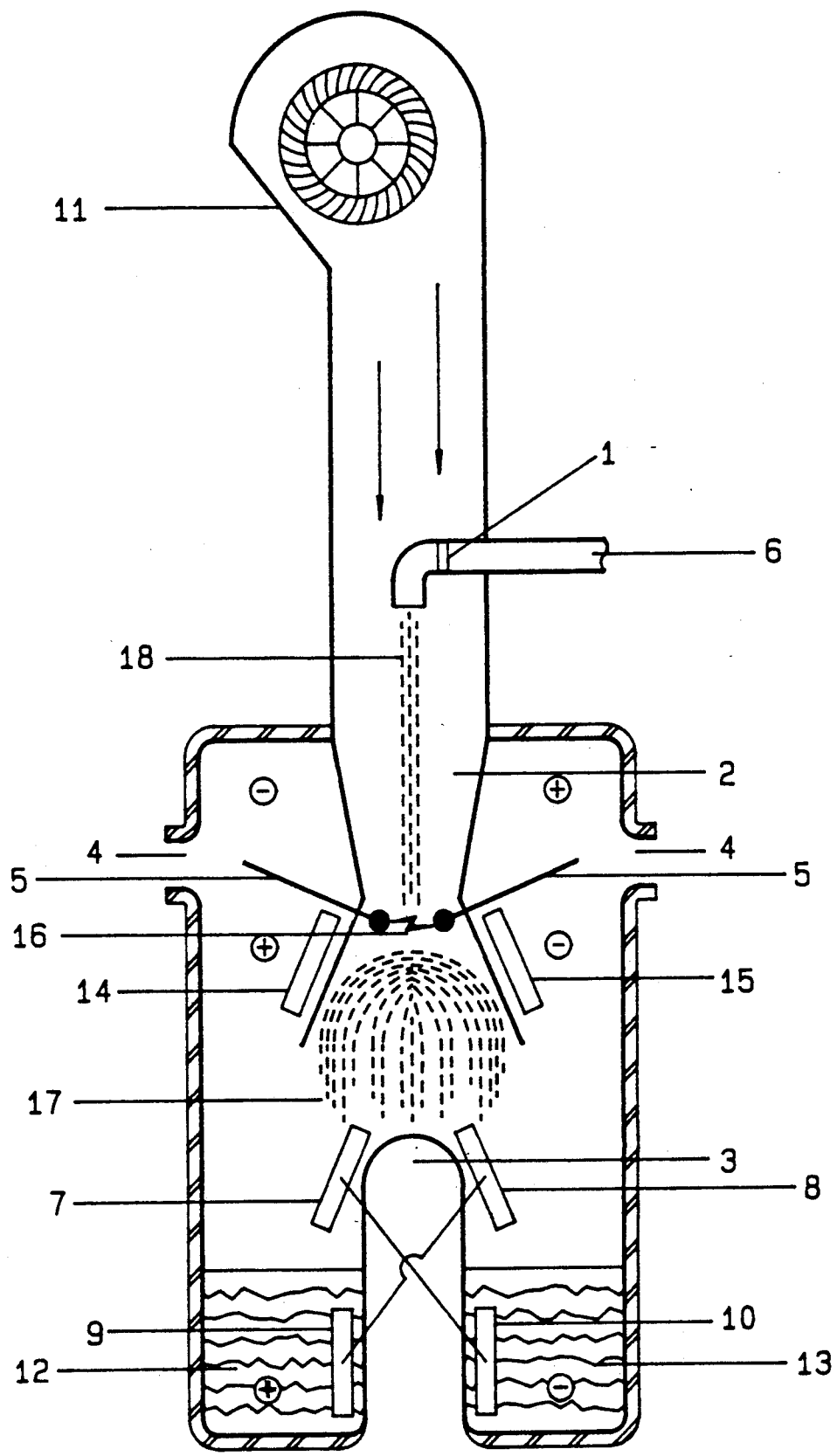

METAL-ION VAPOR ACCELERATOR CELL

BACKGROUND—FIELD OF INVENTION

This invention is for the removal of heavy metals from hazardous waste solutions.

BACKGOUNRD—DESCRIPTION OF PRIOR ART

Heretofore large vats were needed to inject liquid caustic and acid to move the Ph up and down to change the state of the solution so it would precipitate the metals out. It is then pressed, dried, and stored at hazardous waste sites in fifty gallon drums. The generator and his heirs are responsible for life. This new invention and process is named MIVAC, the Metal-Ion Vapor Accelerator Cell. This invention creates a new method of treating heavy metal carcinogenic organic waste solutions through direct current high voltage corona discharge and therefore ion separation can be accomplished depositing metal on polarized collecting plates. The ozone nullify the organics.

In the prior art of U.S. Pat. No. 4,755,671 of July 5, 1988, by inventors Lazar Friedland, Michael Geva, Kibbutz Givat Hayim Meuchad and Jay Hirshfield, shows a method of separating ions of differing charge-to-mass-ratio through twisted magnetic fields creating momentum in which the heavier positive ions can not make the turns negative ions do and are therefore collected on their respective charge plates.

Thus the prior art does not create the ions; it only separates them. In the Metal-Ion Vapor Accelerator Cell invention, the separation that takes place in the electric flame blow-out, moves the ions by deflective force fields onto respective polarity collecting plates.

OBJECTS AND ADVANTAGES

The main object of the Metal-Ion Vapor Accelerator Cell is decontamination of chemical polutants or hazardous waste by changing chemical structure of metal ionic conductors into its smallest form. The greatest advantage is the thousands of barrels of heavy metal salts sent to hazardous waste sites can be recovered into these hard metal forms.

DRAWING FIGURE

The drawing is a perspective view of the Metal-Ion Vapor Accelerator Cell Invention.

REFERENCE NUMERALS IN DRAWING

1: Flat Spray Head
2: Rectangular Orifice
3: Non-Conductive Hemisphere
4: To Condensing Flue
5: Electrodes
6: Line from Electrolyte Fluid Pump
7: Left Upper Negative Collector Plate
8: Right Upper Positive Collector Plate
9: Left Lower Positive Collector Plate
10: Right Lower Negative Collector Plate
11: Air Blower
12: Left Tank Positive
13: Right Tank Negative
14: Positive Force Field Conductor
15: Negative Force Field Conductor
16: Spark Gap
17: Separated Ions
18: Electrolyte/Ion Conducting Fluid

DESCRIPTION

This machine consists of three cells, each the same as the first. Each cell has its own fluid pump with a bank of flat spray heads (1) directed down through a long rectangle orifice (2). Contained in the orifice on each side is a bank of electrodes, (5) connected to a high voltage direct current supply. In the face of the rectangle orifice (2) sits a non-conductive hemisphere (3) running the length thereof. Forty-five degrees off center, one on each side of the rectangular hemisphere, are conductive collector plates (7) (8) that run the length thereof, on each side of the hemisphere in its's own non-conductive tank with a conductive collector plate (9) (10) in each below fluid level. These plates are connected. The left collector plate (7) on the hemisphere to the plate in the lower right tank (10). The right collector plate (8) on the hemisphere to the plate (9) in the lower left tank. On the other side of the channels between the rectangle orifice (2) and the hemisphere (3) are isolated force field conductors (14) (15) that run the length thereof. They are connected to a high voltage direct current. Negative on one side of the hemisphere and positive on the other side respectively. The first cell is the only one equipped with an air blower (11). The blown air is channeled through the rectangle orifice of flat spray heads (1) and electrodes, (5) dividing over the hemisphere (3) across the fluid in each tank and up through a condensing flue (4) to the next cell back through its rectangle orifice. It then exits from the last cell into a condensing flue and scrubber.

OPERATION

The electrolyte fluid should be pre-heated to 160 degrees to 200 degrees before being pumped into the first Metal-Ion Vapor Accelerator Cell tank. The electrolyte (6) is then sprayed flat (1) through its rectangle orifice (2) where as droplets form the direct current high voltage electrodes (5) trigger corona discharge because of the lowering resistance of the fluid. This ionizes and vaporizes with a greater concentration of positive ions near the positive electrode, but with a more or less even spread of negative ions between the negative and positive electrodes (5). This occurs because of the mass of the positive ions is greater than the negative ions and moves slower. As blown air (11) coming through the rectangle orifice (2) the corona breaks, leaving stranded ions from reuniting (16). They are pushed along into a polarized force field, (14) (15) directing and accelerating them onto charge collectors plates (7) (8) on the sides of the hemisphere, (3) forming into molecules. Some ions that get by the collector plates (7) (8) go into solution in the tanks (12) (13) which give it its polarity charge. The solution in the tank on the side of the positive electrode becomes positive (12). The solution in the tank on the side of the negative electrode becomes negative (13). This is how the collector plates (8) and (7) on the side of the hemisphere (3) become charged. The plate in the tank in the negative solution (13) is connected to the collector plate (7) on the opposite side of the hemisphere and the same side as the positive electrode (14). And vice-versa. The plate in the tank in the positive solution (9) is connected to the collector plate (8) on the opposite side of the hemisphere and the same side as the negative electrode (15). The electrolyte is then pumped into an identical second cell for a more noble metal recovery. And then to a third cell with the remaining electrolyte re-introduced to the first cell. The hot vapor laden air moves into a condensing flue where water is removed. The same air is blown through to the next cell, through a condensing flue for more water removal. Then onto the third cell through its condensing flue and scrubber for any waste material. The remaining inactive material in solution is not filtered until a final clean water rinse.

SUMMARY, RAMIFICATIONS, AND SCOPE

The design of the Metal-Ion Vapor Accelerator Cell is for mass movement of waste electrolyte over collector plates creating an amalgam of metal that now may be purified for recovery. Up to now this material has been discarded as hazardous waste. The electrolyte is depleted more than any other process because ionization is taking place to all the elements. So the end result is inert material except in the case of the radio-active material. The fluid atomizing corona discharge head can be laid out in varying configurations as if spray plating of metal or non-metal form. Thin non-conductive films can be made depending on the electrolyte. The effect would be the same as electroless plating with even throwing power in recesses. Thicknesses on high points and low flats are the same. The Metal-ion vapor accelerator cell can be used in small deposits of rare ore extraction from the evaporates of playas because of its portability and because differing electrolytes for each metal are not needed, just one. In removing radio-active metal ions from a decontamination solution the unit would be closed to evaporation. The solution would be regenerated as the radioactive metal ions formed into molecules. Solid radio-active metal bars would then be the by-product. There are no anodes or cathodes to be spent because of the separation of the positive ion and the negative ion in vapor. The deposits are on the polarity of the collector plates.

Although the description of the Metal-Ion Vapor Accelerator Cell contains many specificities, these should not be construed as limiting the scope of the invention, but as merely providing illustrations of some of the presently preferred embodiments of this invention.

Thus the scope of the Metal-Ion Vapor Accelerator Cell invention should be determined by the appended claims and their legal equivalents.

I claim:

1. An apparatus for separating and removing heavy metals from a liquid ionic conductor containing heavy metals comprising:
   a separating zone comprising:
   an inlet means for directing a liquid ionic conductor through an orifice in said separating zone; first and second electrodes disposed on opposite sides of said orifice; a means for producing pulsed direct current corona discharge operatively connected to said electrodes; a means for deflecting ions produced in said corona discharge, disposed vertically below said first and second electrodes;
   a collecting zone disposed vertically below said separating zone comprising:
   a first tank for collecting positive ions; a second tank for collecting negative ions; a rectangular hemisphere separator for separating said first and second tanks, with a means on said separator for collecting heavy metal ions.

2. An apparatus as set forth in claim 1, wherein means for collecting comprises of charged plates.

3. An apparatus as set forth in claim 1, wherein means for deflecting ions comprise of a electro-magnetic force field.

* * * * *